Figure 1:
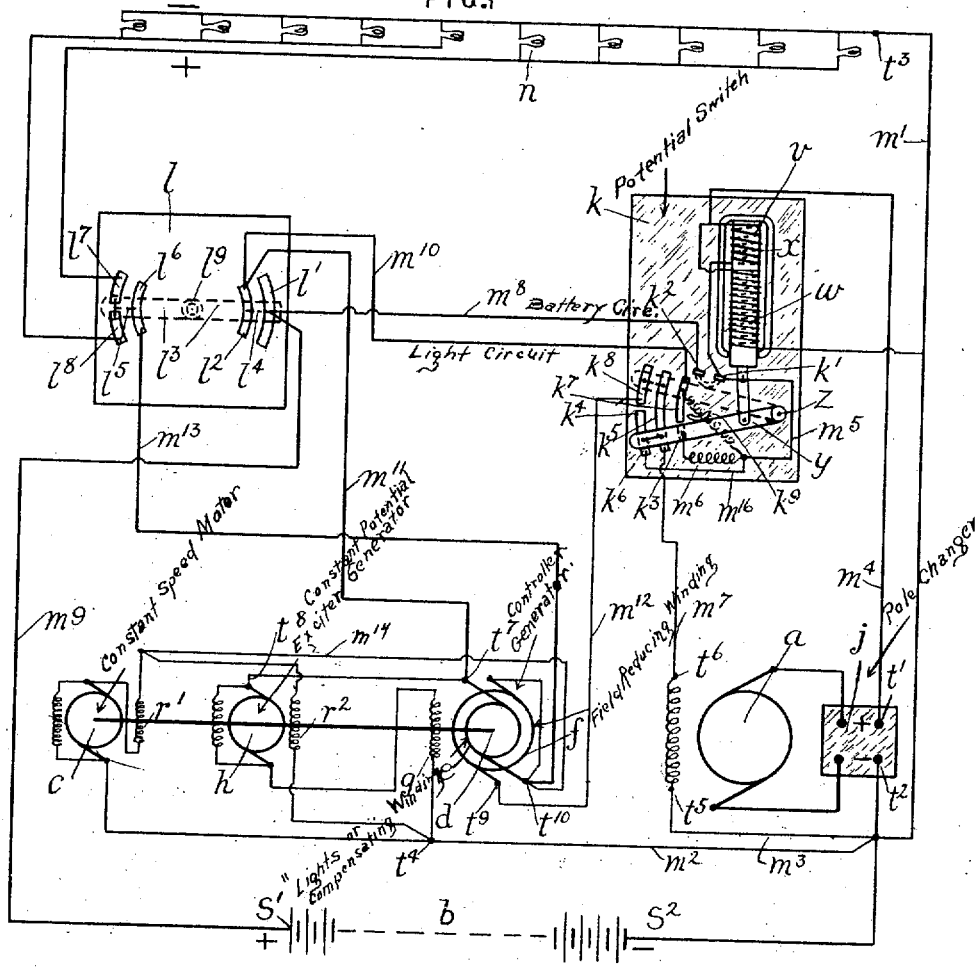

J. DALZIEL.
VOLTAGE REGULATED ELECTRIC LIGHTING SYSTEM FOR RAILWAY AND OTHER CARRIAGES.
APPLICATION FILED SEPT. 27, 1904.

977,074.

Patented Nov. 29, 1910.

3 SHEETS—SHEET 1.

J. DALZIEL.
VOLTAGE REGULATED ELECTRIC LIGHTING SYSTEM FOR RAILWAY AND OTHER CARRIAGES.
APPLICATION FILED SEPT. 27, 1904.

977,074.

Patented Nov. 29, 1910.

Witnesses

Inventor

By James Dalziel
Attorney

UNITED STATES PATENT OFFICE.

JAMES DALZIEL, OF DERBY, ENGLAND.

VOLTAGE-REGULATED ELECTRIC-LIGHTING SYSTEM FOR RAILWAY AND OTHER CARRIAGES.

977,074.  Specification of Letters Patent.  Patented Nov. 29, 1910.

Application filed September 27, 1904. Serial No. 226,186.

*To all whom it may concern:*

Be it known that I, JAMES DALZIEL, a subject of the King of Great Britain, residing at Derby, in the county of Derby, England, have invented certain new and useful Improvements in Voltage - Regulated Electric-Lighting Systems for Railway and other Carriages, of which the following is a specification.

The object of my invention is to provide a system of electric supply in which the voltage of the system is automatically regulated and which is particularly applicable to the lighting of railway carriages or other vehicles, in which power is derived from an axle of the vehicle which drives the necessary dynamo, but which varies in speed. In such vehicles one or more storage batteries each of an appropriate number of cells are in general fitted to work in combination with the generating apparatus so as to supply current during stoppages and slow running of the said generating apparatus. It being premised that a constant pressure is required at the lamps, the difficulties to be overcome in designing apparatus of this description are mainly those of the variation in speed of the axle driving the dynamo, and of the different pressures required for the lamps and for the charging of the battery respectively. In the case of such circuits, however, there are also other variants affecting the voltage of the system across the lamps or other translating devices, as for example the number of translating devices in circuit and consequently the demand for current varies from time to time, and the battery voltage varies according to its state of charge, while there are other minor variations such as are caused by armature reactances, reversal of rotation, position of brushes, copper resistance of cables and the like.

In the voltage regulating systems employing indirect regulating means such as speed governors, torque mechanism, devices responsive to changes in the main current, such as solenoids and the like; it is only possible to compensate approximately and only for given current values and there is considerable loss of energy in the use of resistances, belt-slip, gearing, &c.

In systems which employ constant current regulation dependence must be usually placed upon the battery for regulating purposes, the current to the battery being a minimum when all the translating devices are in use and a maximum when the whole of these are out of circuit. When therefore lights, or other translating devices are being much used the battery is not properly charged and when they are little used it is much overcharged, both of these conditions involving its deterioration, while the latter also involves much waste of energy.

Most of the present systems employing more direct means of regulation are either dependent for their regulation upon batteries as a constant potential source or upon resistances of some kind, such as rheostats, which are made responsive to voltage variations in one or more of the circuits, either of which are very undesirable.

The object of my invention is to secure a system which approaches more nearly the ideal system of voltage regulation as fully set forth below.

In my invention the system is well adapted for use where the main source of energy is liable to wide fluctuations of voltage. The system is independent of the battery for its regulation except in cases when the vehicle comes to a stand-still, and neither is there any varying resistance made use of in any of the circuits, the use of which would cause fluctuations of voltage due to loose or poor contacts and other defects found in rheostats of various forms.

In my invention the method made use of for controlling the voltage impressed upon the translating devices consists in varying the excitation of the main and auxiliary generators according to fluctuations in the voltage of the system, and involves no energy wasting or fluctuating elements.

The advantage of having the variations in voltage take place in every instance by varying the magnetization of the various machines instead of using rheostats to create a variable potential is as great or even greater than the advantage of controlling the voltage on any line by varying the excitation of the generator by rheostats in its field circuit instead of using a rheostat in the main line; for in the system employed by me no rheostats are even used in the exciting coils and consequently a system is obtained which is smooth and even working and at the same time highly sensitive to any changes in voltage and kept free from fluctuations by the dampening effect of the various magnetic circuits through which each change must take place. By this arrangement I obviate the sudden jerky effects of rheostats and like apparatus. In this manner the system is kept in a responsive condition, readily sensitive to the slightest voltage changes and at the same time capable of maintaining a constant voltage through wide and sudden fluctuations in load and speed.

In an ideal system regulation would be accomplished by the effect upon the pressure of the dynamo of its own changes of potential alone toward the maintenance of its pressure approximately constant, such regulation to be entirely independent of and unaffected by battery conditions, and to be such that apart from the question of supplying the translating devices during stoppages of the dynamo the battery can be dispensed with altogether. Where, as will be general, a battery is in circuit, and also in order to limit the size and give to regulating devices definite capacities capable of being dealt with by apparatus of moderate size and normal design, it is preferable to limit the pressure of the dynamo to a definite maximum value which should be such that, the dynamo being connected across the battery terminals and its pressure being applied across the battery, the said pressure will properly charge the battery but will permit the current to it to fall approximately to zero when it is fully charged. The necessary and permissible rise of pressure which thus takes place should in general as regards the mains supplying the translating devices be as it occurs automatically compensated for, so as to maintain the voltage across these devices substantially constant, but the voltage impressed across the battery should not in any way be affected by the demand for current by the translating devices and the rate of charge of the battery should be independent of all conditions of the circuits save only the state of charge of the battery itself. Constant voltage being required and the most direct acting apparatus being preferable the whole of the working should also be electrical and effected by voltage changes only, and it is to the accomplishment of these ends that my invention is aimed.

My invention consists in the provision of a standard source of potential the pressure of which is substantially constant but is raised or lowered to some extent by the effect on it of variations of pressure of the supply circuits and with a view to maintaining the latter pressure constant, this standard potential being balanced against the pressure generated by the variable speed dynamo and impressed across the battery, at any time, and one or more armature windings being excited by the difference between these pressures so that there is produced in the said windings counter electromotive force, the amount of which varies in definite proportion as, but in greater proportion than, the dynamo pressure rises and falls, and which, being introduced into the dynamo field circuit, and also in some cases, but in a different proportion and smaller amount into the main circuit, limits the possible variation of the pressure of the dynamo between definite limits and, in those cases where it is introduced into the main circuits, compensates on the circuits supplying the translating devices for such variations as are permitted. The regulation will therefore be effected solely by pressure variations of the dynamo and the effect on the regulation of all other variants in the circuits will be eliminated. The maxium voltages permitted will cause the battery where such is used to be properly charged but will protect it from being overcharged.

Figure 2:
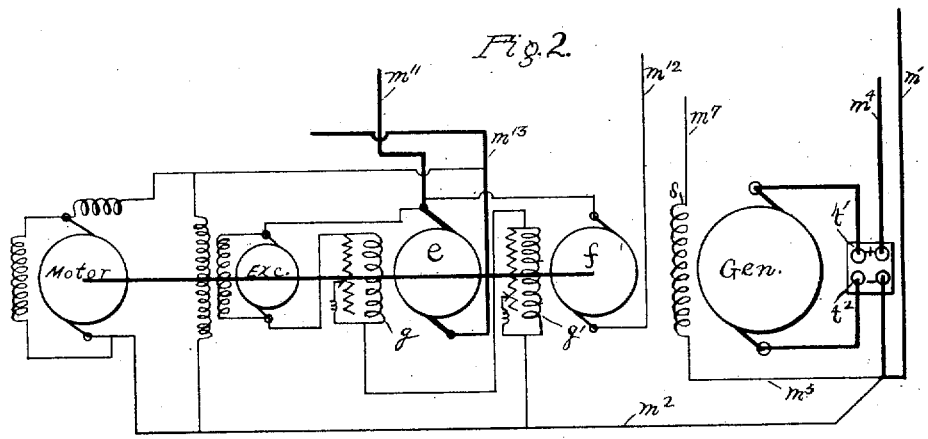
Figure 3:
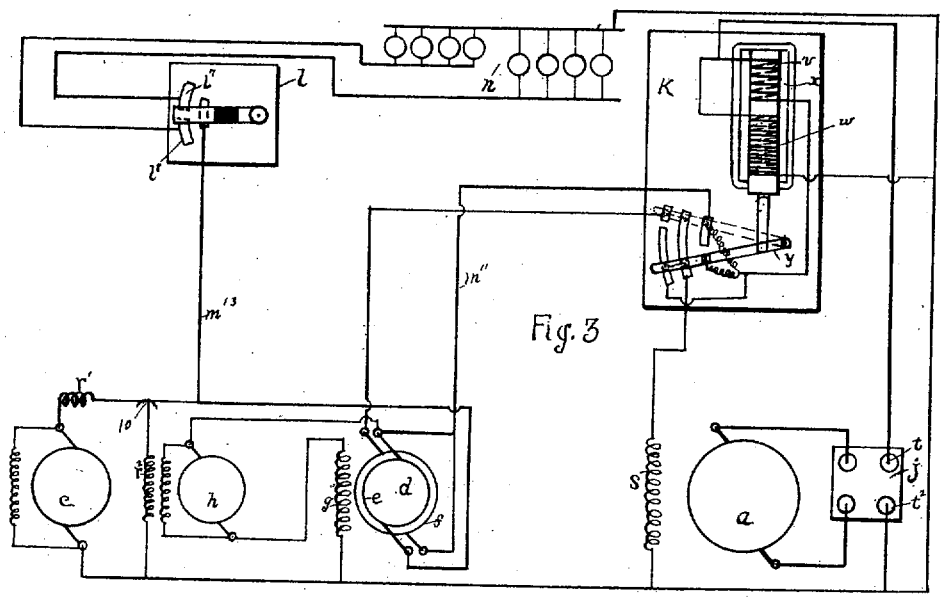
Figure 4:
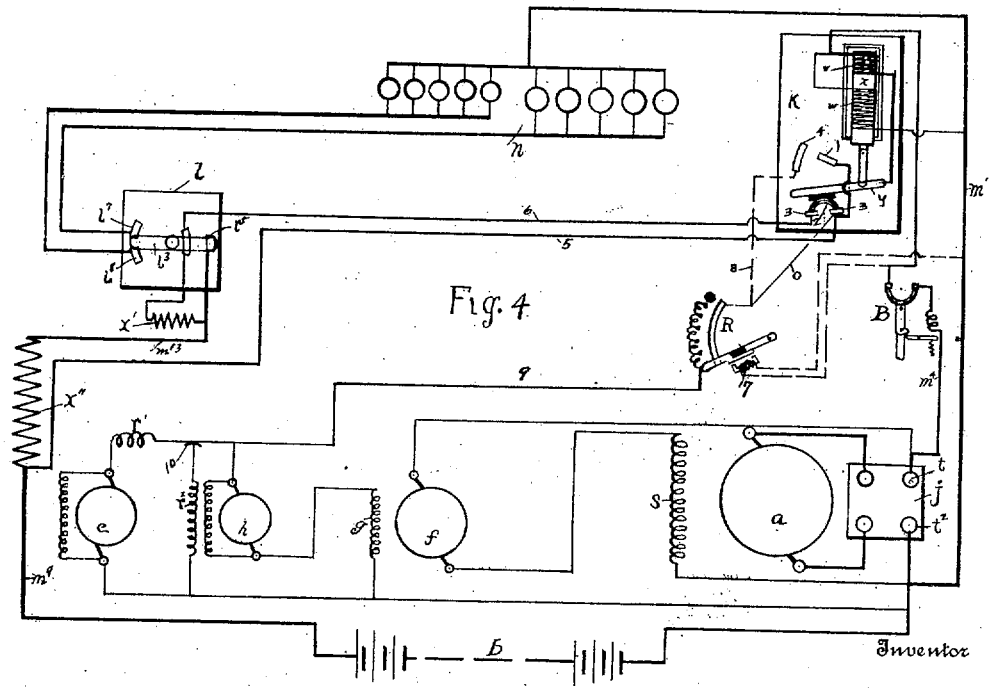

In the accompanying drawings Figure 1 shows the general arrangement of my system. Fig. 2 shows a modification in which the windings $e$ and $f$ are placed on separate machines, having a shunt resistance about their exciting coils $g$. Fig. 3 shows a modification in which no batteries are used and Fig. 4 shows a suitable form, for use with light vehicles, the coil $e$ being omitted.

In Fig. 1 which illustrates one modification of my invention as applied to the lighting of a railway coach $a$ represents a dynamo driven either directly or through gearing by one of the axles of the vehicle; this dynamo should be designed to work satisfactorily in either direction of rotation under all conditions of its load.

$b$ is a battery of any suitable type and number of cells; which may be omitted when regulation alone and not storage is the object.

$c$ is a constant speed motor adapted to drive a generator $d$. This generator which is referred to hereafter as a controller is provided with two armature windings $e$ and $f$ and has a single field magnet system and set of field coils $g$. The field should preferably have its iron parts worked at a low magnetic induction and laminated so as to be sensitive to and accurately respond to changes in magnetic force.

$h$ is a small generator hereinafter referred to as an exciter which is provided to give an approximately constant potential so as to serve as a standard source of potential. This exciter is mounted on the same shaft as the controller $d$ and also driven by the same constant speed motor $c$. The motor $c$, controller $d$ and exciter $h$ constitute the regulating machines of the system.

$j$ is a pole changing or reversing device which may be of any suitable well known type and may be automatically operated, mechanically, electrically or by a combination of these methods.

$k$ is an electro-magnetically operated switch adapted to put into and to cut out of circuit the dynamo $a$ and in some cases the regulating machines, when a predetermined voltage in the circuit is attained.

$l$ is a main switch adapted to control the supply circuit and in some cases to put the regulating machines into action. Switches and fuses not shown in the diagram may be inserted in the circuits as required by individual coaches.

The operation of my invention is as follows:—As the polarity of the terminals of the dynamo $a$ varies according to the direction of rotation the switch $j$ is constructed so as to automatically reverse the connections between the terminals $t'$ and $t^2$ of the switch when reversal in the direction of rotation takes place so that one of the terminals, say $t'$ is always positive and the other $t^2$ negative. This may be accomplished by the use of any of the well known methods of automatically reversing the connections on a switch. Where there is no storage battery included in the circuit this reversing switch will not normally be required. In the present modification the negative terminal $t^2$ is connected directly to the negative terminal $s^2$ of the battery. To the terminal $t^2$ are also connected leads $m'$, $m^2$ and $m^3$, $m'$ being connected to the negative terminal $t^3$ of the translating devices shown in the diagram as a number of incandescent lamps $n$; $m^2$ being connected to the negative terminal $t^4$ of the regulating machines and $m^3$ being connected to the negative terminal $t^5$ of the shunt winding of the main dynamo $a$. The positive terminal $t'$ of the reversing switch is connected by a heavy lead $m^4$ to the electro-magnet switch $k$ and carries the main current both to the battery and to the lamps. This switch $k$ is provided with a magnet $v$ having a fine wire winding $w$ connected across between the positive lead $m^4$ and the negative lead $m'$ so that current passes through this coil whenever pressure is generated by the dynamo $a$. The magnet $v$ is also provided with a thick wire winding $x$ connected in series with the lead $m^4$ and to a contact $k'$ of the switch $k$. From this contact current passes by way of a lead $m^5$ and a flexible lead $m^6$ to a movable contact $k^3$ carried on the moving arm $y$ which is pivoted at $z$ and mechanically connected to the moving core or plunger of the electromagnet $v$.

When the dynamo $a$ is not in action the movable arm $y$ of the switch $k$ occupies the position shown in the diagram in which position the positive terminal $t^6$ of main dynamo shunt winding is connected through lead $m^7$, contact $k^5$, bridge piece $k^6$, contact $k^4$ leads $m^{16}$ and $m^5$, contact $k'$, coil $x$, lead $m^4$, to the positive terminal $t'$ of the switch $j$ and thence to the positive terminal for the time being of the dynamo $a$ so that under these conditions the main dynamo is connected as a direct shunt machine. The terminal $k^2$ is connected through lead $m^8$ to the contact $l'$ of the main switch $l$ and from thence by the lead $m^9$ to the positive terminal $s'$ of the battery $b$. The connections for feeding current from the main switch $l$ to the lamps or other translating devices will be more particularly described hereafter.

When the dynamo $a$ begins to rotate it excites itself owing to its being connected as a shunt machine and when the current generated has attained to a predetermined pressure, preferably a slightly greater pressure than the normal pressure of the battery $b$ and translating devices $n$, the current passing through the fine wire coil $w$ becomes strong enough to cause the electromagnet $v$ to lift its core and so raise the arm $y$ of the switch $k$ to the position shown dotted on the diagram. In this position the contacts $k'$ and $k^2$ are connected by a bridge piece $k^9$ carried by the movable arm $y$ and the battery $b$ becomes connected directly across the appropriate terminals of the dynamo $a$ and current will pass through the coil $x$ from the dynamo to the battery. If now, for any reason such as the slowing down of the dynamo, current should begin to pass from the battery to the dynamo the current passing through coil $x$ will oppose that flowing in coil $w$ and will demagnetize the electro-magnet $v$ when its plunger will fall by gravity and carry with it the movable arm $y$ thereby disconnecting the dynamo from the battery and other circuits.

As the movable arm $y$ of the switch $k$ rises from the position in which it is shown full in the diagram, the contact $k^3$ will engage with a fixed sector shaped contact $k^7$ from which current passes by way of lead $m^{10}$ to contact $l^2$ of switch $l$, from this contact it passes through lead $m^{11}$ to terminal $t^7$ of the winding $e$ of the controller. This winding $e$ will hereafter be referred to as the "lights" or compensating winding. From terminal $t^7$ current passes to terminal $t^8$ of the exciter $h$. As the bridging piece $k^6$ is raised it connects contact $k^5$, which is connected to the positive shunt terminal $t^6$ of the dynamo through lead $m^7$, with the contact $k^8$ which is connected through the lead $m^{12}$ to the terminal $t^9$ of the winding $f$ of the controller. In following out these circuits it will be seen that as soon as the connection between the contact $k^3$ and $k^7$ is established current will be supplied to the regulating machines by circuits which may be traced as follows:—from positive terminal $t'$ of the dynamo, line $m^4$, through coil $x$ of the switch K, contact $k'$, conductor $m^5$, through lead $m^6$ to contact $k^3$, through switch blade $y$ to contact $k^7$, line $m^{10}$, contact $l^2$ of switch $l$, line $m^{11}$, to terminal $t^7$, through compensating winding $e$ to terminal $t^{10}$, conductor $m^{14}$, through the driving motor back to negative terminal $t^2$ of the main dynamo by way of line $m^2$. It will be seen from this that the driving motor will start running, and the exciter generator being self-exciting and having its differential winding energized, will be in condition to excite coil $g$ and thereby, through means of the "controller generator," regulate the voltage of the system. It will also be seen that when the connection between contacts $k^4$ and $k^5$ is broken and that between $k^5$ and $k^8$ made the dynamo $a$ is no longer connected as a simple shunt machine but has the windings $e$ and $f$ of the controller interposed in series with its field circuit since the winding $f$ which will be referred to hereafter as the field reducing winding, has its terminal of opposite polarity to $t^9$ already shown to be connected to the dynamo positive shunt terminal, connected at $t^{10}$ to the pole of the winding $e$ opposite to terminal $t^7$ where connection is made by way of switches $l$ and $k$ back to the dynamo positive armature terminal.

The main switch $l$ is provided with a movable arm $l^3$ pivoted at $l^9$ and fitted with bridge pieces $l^4$ and $l^5$ at either end insulated from the arm. The bridge piece $l^4$ when the switch is moved to any of its operative positions connects fixed contact strips $l'$ and $l^2$ which as described above are connected to the contacts $k^2$ and $k^7$ of the switch $k$ respectively, $l'$ being also connected to the positive terminal $s'$ of the battery and $l^2$ being also connected to the terminals $t^7$ and $t^8$ of the regulating machines. The effect of this connection is that if the switch arm $l^3$ is put in any operative position when the dynamo is not in action, the lamps or other translating devices will be supplied with the necessary current from the battery in a manner hereafter described, and the regulating machines are supplied with current from the battery and set running. The contacts $l^6$, $l^7$ and $l^8$ of the switch control the supply of current to lamps or other translating devices. The contact $l^6$ is connected by the lead $m^{13}$ to the terminal $t^{10}$ of the "lights" winding $e$ of the controller and receives current from the dynamo $a$ or when the dynamo is cut out of circuit from the battery through said winding. From contact $l^6$ current passes through the bridge piece $l^5$ to either or both of contacts $l^7$ and $l^8$, the bridge piece being fitted with a long contact so as to be capable of supplying current to both $l^7$ and $l^8$ when in its center position.

In Fig. 1 of the drawing the lamps are shown as connected in two main curcuits of which the contacts $l^7$ and $l^8$ form the terminals. These translating devices can of course be connected in one, two, or any number of main circuits while with the present system of regulation the lamps and other devices can be grouped into any number of sub-circuits down to their being a switch for every lamp, and these groups or single lights can be switched in and out as may be desired without the regulation of the voltage on the other lamps or the current to the battery being affected in any way. No fuses, sub-circuit switches, or the like are shown since the design, arrangement, and type of these do not affect and are not affected by this system of regulation. When no battery is installed the switches $k$ and $l$ will be simplified. The contacts $k^2$, $l'$ and $l^2$ and the bridge pieces $l^4$ and $k^9$ may be dispensed with and the switch $l$ will become simply an ordinary main switch or switches as shown in Fig. 3.

From the foregoing it will be seen that all current to translating devices is supplied through the armature winding of the controller $d$ both from dynamo $a$ and from battery $b$, and that the pressure given by the dynamo $a$ when this is in action is invariably impressed across the battery $b$. The winding $e$ is intended to compensate for the variations in current potential impressed across the mains, supplying the translating devices, by the main dynamo and also when necessary from the battery, so as to keep the pressure on the translating devices substantially constant, and the winding $f$ is intended to re-act upon the electro-motive force impressed across the dynamo field winding by said dynamo so as to keep potential variations within definite and easily dealt with limits independently of speed or other variations, the action of these and the remaining portions of the regulating machines in which the invention lies being as follows.

Both the controller $d$ and the exciter $h$ are driven by the motor $c$ which is connected from terminal $t^{10}$ of the winding $e$ across to terminal $t^4$ and thence to $t^2$ the main negative terminal. It is therefore run off the constant potential mains supplying the translating devices and it is also constructed with the slight series winding $r'$ shown on the diagram so as to secure constant speed. This motor might however be connected across the dynamo or the battery terminals.

The exciter $h$ is in general a small shunt wound machine wound to give a potential equal to that of the translating devices for example 20 volts. It is also provided with the differential winding $r^2$ which being coupled from across the terminals of the motor $c$ is at the potential of the translating devices so that should the pressure across these be low it will raise the pressure of the exciter and vice versa. This winding is used to correct for copper resistances and the like, and it will in general be best to take its connections to the most distant or to an average point of the actual lamp mains. Any desired point can thus of course be kept at an even potential notwithstanding loss of pressure in feeders and the like, such losses being as will be seen when the action of winding $r^2$ is explained automatically compensated for by it.

The connections of this machine in the circuit from its terminal $t^3$ which as above shown is at the potential of the dynamo positive terminal, through field winding $g$ of the controller $d$ to the terminal $t^4$ which is at the potential of the dynamo negative terminal, and the fact of its normally giving a voltage equal to that of the translating devices has the effect of causing the coil $g$ to have at any instant a voltage across it exactly equal to that by which the dynamo or battery voltage at that instant differs from the voltage of the translating devices. If then the windings $e$ and $f$ which are excited by the field coil $g$ be wound to give between them a total of five or any other suitable number of volts for each volt across $g$, as the dynamo speed rises and its voltage tends to rise proportionally, since windings $e$ and $f$ are in series with its exciting coil and have induced in them a counter electromotive force tending to reduce its field strength at a much greater rate than by which its own armature pressure rises, its pressure variations are limited and a maximum reached beyond which it is impossible for its pressure to go, since were this point passed its field strength would be reduced to zero. The dynamo being connected straight across the battery this maximum value will suitably be such as to insure cells being at all times properly charged but also such that the rise of counter electromotive force of these as they become charged cuts down the current to them so as to obviate overcharge. This maximum may for example be 2.5 volts per cell and the pressure variations of the dynamo would then be confined between limits of 2 to 2.5 volts per cell. This effect might be obtained by the use of one winding only, in which is induced the full counter electromotive force but by employing two windings as described the first can be made of sufficient capacity to carry the main current to the translating devices as well as the exciting current of the dynamo and to have induced in it only such voltage as exists at any instant across the field $g$. As it is, as has been explained, in the circuit from the dynamo and battery to the translating devices and as its effect on the dynamo field excitation combined with that of winding $f$ renders the pressure variations to be dealt with comparatively small it will cut off from, or where the voltage is low as will sometimes be the case when the battery is supplying current, will add on to, the dynamo or battery voltage the exact voltage required to make this latter pressure correct for the said translating devices which will therefore be supplied at constant pressure notwithstanding any variations of dynamo or battery pressure, since such variations will be invariably compensated for to the proper extent. Should however the exciter be caused to give a higher voltage owing to the effect of coil $r^2$—the lights pressure being low—less volts or more volts in the reverse direction will be across $g$ and in $e$ so that less will be cut off or more added on, and vice versa; any undue rise or fall in pressure will therefore be corrected. The cells will in general be of a number such as to give the normal voltage of the translating devices at 2 volts per cell but it will be clear that owing to the action of the regulating machines this is not essential and the capacity of the regulating machine might be reduced were fewer cells installed since the maximum dynamo voltage would then be less. As an example of the general action of the regulating machines, taking a normal voltage of 20 and a factor in the windings $e$ and $f$ of 5, that is 1 in $e$ and 4 in $f$, when the dynamo is giving 24 volts the winding $e$ is cutting off 4 volts giving the proper pressure of 20 volts on the translating devices while the winding $f$ is giving 16 volts so that 4 volts only is across the dynamo shunt field. Were it possible for the dynamo to give 25 volts its field would be 25—5—20=zero. In supplying from the battery, were this giving a lower than normal voltage windings $e$ and $f$ would both increase the supply pressure.

Fig. 2 shows a modification of the arrangement of the parts of the controller generator and its exciting coil. In this figure the windings $e$ and $f$ are placed on separate iron cores and each has its own exciting coil $g$ $g'$ respectively. Each of these exciting coils or either one of them may have around it a variable shunt resistance which may be inductive or non-inductive and which may be made use of in changing the maximum voltage of system, as for instance, in giving the batteries an extra charge by varying the strength of the exciting coils $g$ $g'$ and thereby regulating the electromotive force across the translating devices or battery and the main generator exciting coil, or either, independent of the speed of the main generator or the motor driving the exciter and controller generators. As shown in this figure instead of having the voltage regulating set consisting of a three unit set we have the four machines coupled on the same shaft. In this modification the controller generator $e$ only carries the current to the translating devices, the current to the controller generator $f$ branching from conductor $m^{11}$ and passing through controller generator $f$ through the potential switch $k$ to the main generator coil $s$. This allows the use of a smaller controller generator $e$ for a given out-put of the system. It will be noted in the arrangement of Fig. 1 the controller coil $e$ was in series with controller coil $f$.

Fig. 3 shows what is shown in Fig. 1 with the batteries omitted, namely, a main generator $a$, a compound wound motor driving two auxiliary generators, one an exciter generator $h$ to supply the field of the controller generator $e$, which is the other auxiliary generator, the variation of potential on the main system determining the direction of the resultant current flow in the exciter generator $h$, and therefore the direction of current in the field of the generator $d$, thus ultimately determining the direction of current flow from said generator $d$ into the field coils of the main generator. This in turn determines whether the auxiliary regulating machines involving the controller generator $d$, act cumulatively or differentially to the current in the field of the main generator which comes from said main generator.

In Fig. 4 another modification of my invention is shown in which the controller generator $e$ for carrying the current to the translating devices is omitted and only the controller generator $f$ for controlling the excitation of coil $s$ of the main generator is used. This arrangement permits of a cheaper, lighter, and much more compact system which is very desirable when small floor space and light weight are essential.

In Fig. 4 "K" represents the automatic switch which operates to close the circuits when coil $w$ is energized and which automatically opens on reversal of current in coil $v$ or failure of voltage on coil $w$. B is an over-load circuit breaker in the main line, R a starting rheostat for the motor, which may be omitted in some cases, $x''$ a resistance between the main dynamo and load and $x'$ an additional resistance adapted to be thrown in circuit when only a part of the lamps are used, in order to compensate for the excessive drop in the line with full load over part load. 2 is an insulated metallic bridge to short circuit the resistances when the load is supplied from the batteries.

The operation is as follows:—When dynamo $a$ is started and switch B closed, coil $w$ is energized and switch $y$ raised making contact at $l$ and completing the circuit by a conductor $o$ to the rheostat. Current is then supplied through conductor 5 resistance $x''$, to switch $l^3$, (if it is in the horizontal position) to load $n$. If the switch $l^3$ is rotated so that its rear end leaves contact $l^5$, the small resistance $x'$ is thrown in series with the load, and at the same time a part of the load is cut out. The auxiliary apparatus is started up by means of the rheostat R. Usually the motors will be started before switch $l^3$ is closed, but switch $l^3$ may be closed first and the lamps will be supplied by the batteries through the resistance $x''$. Should the voltage of dynamo $a$ be decreased below that of the battery potential the current will be reversed in coil $v$ which opposing the magnetization produced in core $x$ by coil $w$ allows switch $y$ to drop by gravity, or assisted by a spring or other device, whereby the contacts 3—3 are bridged by 2 and the lamps supplied from battery B through line 5, contacts 3—3, line 6, through switch $l^3$. It is thus seen that the resistances are all shunted around by the bridge 2 and contacts 3—3. This arrangement of the motor and its connections are used when the dynamo is subject to wide fluctuations in potential and the auxiliary apparatus has considerable inertia. In such cases the conductor $o$ is used in order that the motor may be driven from the battery $b$ at any interval while switch K has its arm $y$ in the lower position, for otherwise the motor may be subject to full potential after it has come to a standstill or while running at considerably below normal speed. If the auxiliary apparatus is light and with little inertia the starting switch is omitted entirely or the resistance arranged to be cut out by arm $y$ in which case conductor 8 (shown in dotted lines) is used and the conductor $o$ may be omitted.

The no voltage release coil 7 is only used when the dynamo $a$ is driven independently of the running gear, in case of cars or vehicles, or in other cases when the dynamo potential is kept sufficiently steady to keep coil 7 energized until the driving means for dynamo $a$ fails, for in such cases it is best to have the motor automatically stopped until the dynamo is again started. The differential coil $r^2$ is shown with a sliding contact 10 and in practice might be connected to any point along the load to compensate for the drop in the line to that point, but it is shown connected as in the drawing for simplicity of circuits.

The dynamo voltage is, as in the fully described modification and by the same means, namely, the reduction of its field strength by the effect of the field reducing winding, limited to the maximum required for properly charging but not overcharging the battery. A resistance is connected in the, or in each, load circuit to reduce the dynamo voltage to that properly required for the translating devices and thus and by the effect of the winding $r^2$ which raises and lowers the standard potential of the exciter, as necessary, pressure is maintained sufficiently steady for this class of vehicle. Contacts are provided on switches $k$ and $l$ for dealing with the resistances which are short circuited by contacts on switch *k* when the dynamo becomes inactive, current being then supplied from the battery direct without the regulating machines running as shown in Fig. 4. Other slight alterations of the connections, arrangement, switch contacts and the like may also be made in connection with this and other modifications of the system.

In the case of the last mentioned modification there is a loss of energy due to the dissipation of voltage in the resistance I have mentioned. In the first modification however this energy being cut off as a counter electromotive force in the winding *e* motors the controller and together with the exciter *h* and the winding *f* which also motor, causes the motor *c* to act as a generator, a large proportion of the energy being thus recovered. As this also happens when the battery is making supply, the excess voltage of a highly charged battery is converted into energy at the proper pressure, the contained energy of the battery is conserved and its period of storage lengthened while the translating devices are protected from unduly high pressure being put across them.

Although I have used the expression "lights winding" "lights or lamp mains" and the like and described my invention as more particularly applied to the lighting of vehicles it will be obvious that current generated and regulated as described above may be used for other purposes than that of lighting such as for example for ventilating and heating in which cases the "windings" "mains" "circuits" and the like mentioned as pertaining to "lights" will equally refer to the circuits for these purposes. Also though I have referred to widely variable speed dynamos such as more particularly used in connection with the lighting of railway and other vehicles it should be understood that my invention equally relates and is applicable to the regulation of any dynamo whose speed varies widely.

It will be obvious to those skilled in the art, that many modifications other than those herein set forth and described, may be made without departing from the spirit of my invention.

Having thus described the nature and object of my invention, what I claim as new, and desire to secure by Letters Patent, is:—

1. In a system of electrical distribution, the combination with a generator and its field magnet exciting coils supplied from any proper source, a unitary source of auxiliary electromotive force, means comprising a second unitary source which introduces into the circuit of the said main generator's exciting coils a varying potential from said auxiliary source on a variation from the normal potential of the system, in such a direction as to maintain constant potential on the system.

2. In a system of electrical distribution, the combination with a main generator supplying translating devices with electrical energy at constant potential, exciting coils for said main generator and supplied from any proper source, a unitary source of variable potential and means comprising a second unitary source governed by the variation of main line potential for introducing into the exciting coils of the main generator a varying potential from the unitary source of variable potential on a variation of main line potential, in such a direction as to maintain constant potential on the system.

3. In a system of electrical distribution, the combination of a main generator, translating devices, a constant potential generator, a source of variable potential, means for putting in circuit with the exciting coils of the main generator the source of variable potential after the potential of said main generator reaches a certain predetermined amount and circuit connections whereby the source of variable potential is excited by the algebraic sum of the potentials of the main generator and the constant potential generator.

4. In a system of electrical distribution, the combination of the main generator, of translating devices supplied therefrom, exciting coils for said main generator and supplied with energy from said main generator, a source of auxiliary energy, and means for connecting said auxiliary source in circuit with the exciting coils of the main generator when the potential of the said main generator has reached a certain predetermined amount, means which cause said auxiliary source of energy to aid or oppose the energy from the main generator supplied to its exciting coils.

5. In a system of electrical distribution, the combination of a main generator, of translating devices supplied therefrom, exciting coils for said main generator and supplied with energy from said generator, a source of auxiliary energy and a second auxiliary generator, and means for connecting said auxiliary source in circuit with the exciting coils of the main generator when the potential of the main generator reaches a certain predetermined amount, means acted upon by the respective potentials of the main generator and the second auxiliary generator to cause the source of auxiliary energy to aid or oppose the energy from the main generator supplied to its exciting coils.

6. In a system of electrical distribution, a main generator, a motor, an auxiliary controlling generator, and automatic means for connecting said auxiliary controlling generator as a booster or counter E. M. F. generator in circuit with the exciting coils of the main generator upon the potential of the main generator reaching a certain predetermined amount whereby the supply of voltage to the system is maintained constant.

7. In a system of electrical distribution, a main generator, a motor, an auxiliary constant potential generator, and an auxiliary controlling generator, means for connecting said auxiliary controlling generator in circuit with the exciting coils of the main generator, the auxiliary constant potential generator acting to determine whether the auxiliary controlling generator shall aid or oppose the current supplied to the exciting coils of the main generator from said main generator.

8. In a constant potential system of electrical distribution, a main generator and a constant speed motor constant and variable potential generators, which variable potential generator is connected to the field energizing coils of the main generator, said generators and motor being connected by an automatic potential switch upon a predetermined variation of voltage from the normal voltage of the system.

9. In a constant potential system of electrical distribution, a main generator, a constant speed motor constant and variable potential generators, which variable potential generator is connected to the field energizing coils of the main generator, an automatic switch controlled by the potential of said main generator, and means for controlling the effect of the energy of said variable potential generator upon the exciting coils of the main generator.

10. In a system of electrical distribution, a main generator, a motor, and a variable potential generator on the shaft of the motor and means for connecting said variable potential generator as a booster or counter E. M. F. generator in circuit with the exciting coils of the main generator when said generator has reached a predetermined potential to vary the excitation of the same.

11. In a constant potential system of electrical distribution, a main generator, a source of auxiliary variable and reversible potential to be automatically connected in the circuit with the exciting coils of said generator, and an automatic potential switch connecting said source of auxiliary potential in circuit with said exciting coils after the potential of said main generator has reached a predetermined amount.

12. In a constant potential system of electrical distribution, a main generator with its translating devices, a storage battery, exciting coils for said generator, an automatic potential switch and an auxiliary source of variable potential in combination with a constant potential generator, said variable potential source having two sets of windings in inductive relation to a common exciting coil whose exciting energy is the algebraic sum of the potentials of said main generator and said constant potential generator, the coils of said auxiliary source being connected in circuit with the exciting coils of said main generator when voltage of said main generator has reached a predetermined amount, and an automatic reversing switch for connecting said main generator to said battery.

13. In a constant potential system of electrical distribution, a variable speed generator with its translating devices, voltage regulating means consisting of a constant speed motor and a variable potential generator of high magnetic susceptibility having two separate sets of coils on a common core, and means controlling the potential developed by said variable potential generator, and an automatic potential switch operated by said generator at a predetermined potential, for connecting said regulating means to the shunt field magnet energizing circuit of the variable speed generator.

14. In a constant potential system of electrical distribution, a variable speed generator with its translating devices, voltage regulating means for said main variable speed generator consisting of an auxiliary variable potential generator, and driving means, said variable potential generator having two separate coils in inductive relation to a common exciting magnet, and means consisting of a unitary source of substantially constant potential for determining the effect of said regulating means.

15. In a constant potential system of electrical distribution, a variable speed generator, an automatic switch, voltage regulating means consisting of an auxiliary generator of variable potential with driving means, said variable potential generator having two coils excited from a common magnet, the coils of said auxiliary generator being connected in circuit with the exciting coils of said main generator by said automatic switch at a predetermined potential of said main generator.

16. In a system of electrical supply, a source of variable potential, translating devices, means for controlling the potential across said devices, between definite limits, said controlling means consisting of a controller generator, a constant potential generator and driving means, said controller generator having one coil in series with said variable source and another in shunt to said variable source and series coil, and in series with the exciting coil of said variable source.

17. In a system of electrical distribution, a main generator supplying translating devices and voltage regulating means for said main generator, consisting of a three unit set composed of a constant speed motor, and a variable potential generator, a constant potential exciter for said variable potential generator said exciter being in series with the exciting coil of the variable potential generator, said exciting coil being connected between the supply terminals of said exciter and main generator and said motor being driven from the mains of said translating devices.

18. In a system of electrical distribution, a variable speed generator, translating devices, a voltage regulating means connected between said generator and said devices, an automatic means for connecting in the exciting circuit of the generator the voltage regulating means at a predetermined potential, said regulating means consisting of a constant potential generator, driving means, and a controller generator, said controller generator having two separate sets of windings in inductive relation to a common exciting coil, said coil being excited by the difference of potential between the variable speed generator and the constant potential generator, and means for varying the excitation of said constant potential generator to compensate for the variations in line drop between the generator and the translating devices.

Dated this 18th day of August 1904.

In witness whereof I have hereunto set my hand in presence of two witnesses.

JAMES DALZIEL.

Witnesses:
   C. K. Eddowes,
   Geo. R. Eddowes.